A. J. SAVAGE.
VULCANIZER.
APPLICATION FILED SEPT. 10, 1919.
1,389,599.
Patented Sept. 6, 1921.
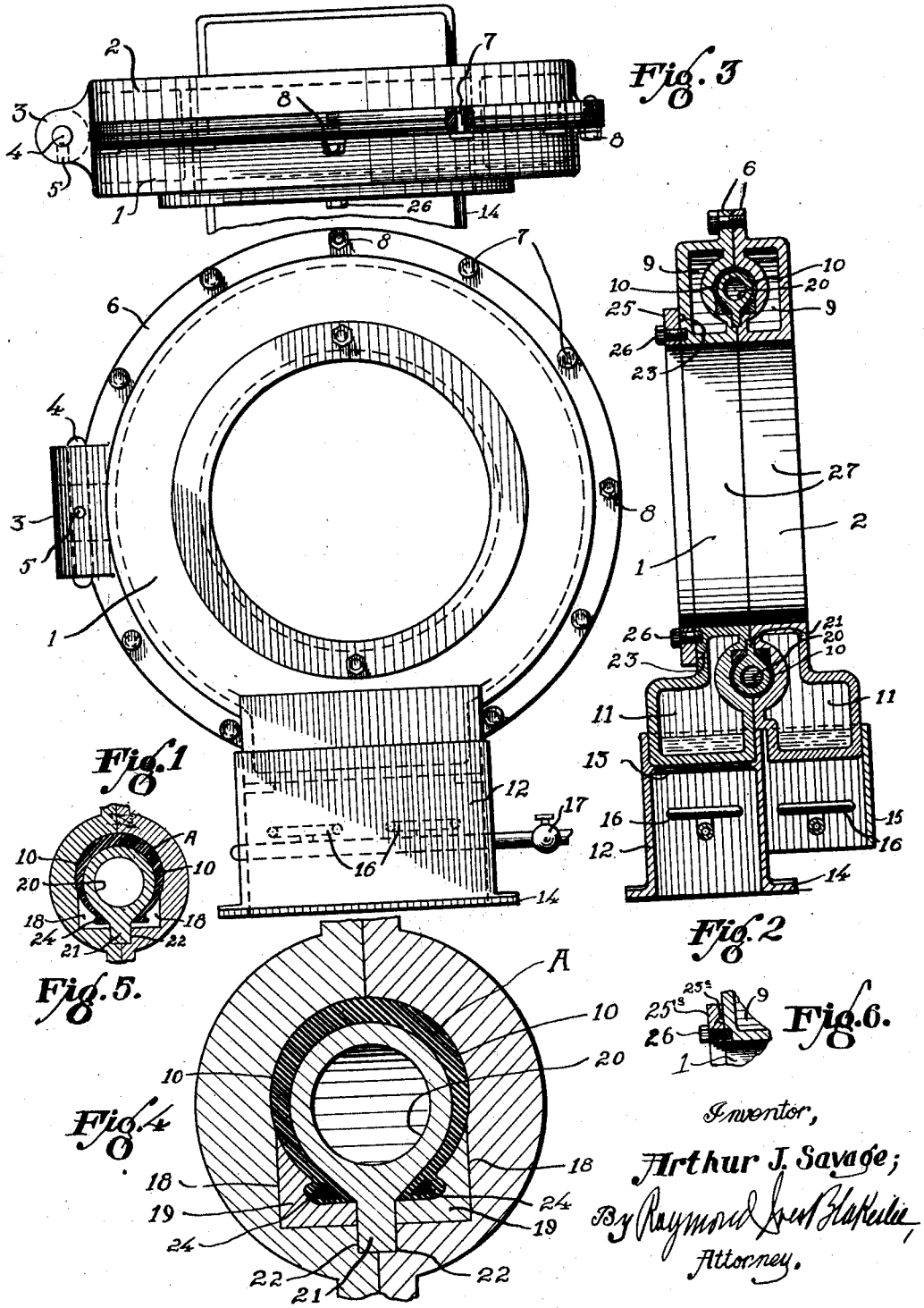

UNITED STATES PATENT OFFICE.

ARTHUR J. SAVAGE, OF SAN DIEGO, CALIFORNIA.

VULCANIZER.

1,389,599.  Specification of Letters Patent.  Patented Sept. 6, 1921.

Application filed September 10, 1919. Serial No. 322,904.

*To all whom it may concern:*

Be it known that I, ARTHUR J. SAVAGE, a citizen of the United States, residing at San Diego, in the county of San Diego and State of California, have invented new and useful Improvements in Vulcanizers, of which the following is a specification.

The present invention relates to a vulcanizer for manufacturing or repairing rubber tires or similar articles, and has for its object to provide a device of this character which embodies novel features of construction whereby a rubber tire or like article can be effectively and thoroughly vulcanized in a simple and economical manner and without loss of time.

With the vulcanizers commonly used in the manufacture and repair of such articles as rubber tires it is necessary to provide large heating chambers and to provide means whereby the tires which are mounted upon cores are subjected to pressure. In the repair of tires it is also a very common practice to successively cure different portions of the tire in a segmental vulcanizer, and this is not only objectionable for the reason that it is slow and expensive, but also for the reason that the end portions of the different sections of the tire which are successively cured must overlap and are over-cured.

In the practice of the present invention it is not necessary to stack a large number of tires in a large chamber for vulcanization, and, in repairing rubber tires the entire tread is vulcanized at the same time, thereby obtaining a uniform cure and preventing the over-cure of certain portions of the tire. When re-treading an old tire the tire beads are not subjected to the heat of the vulcanizing irons and are accordingly not over-cured. The tires to be treated are placed upon a core which is always ready for use and can be inserted in a new tire as soon as it is removed from a tire which has been vulcanized, without the necessity of first cooling the core.

Among the further objects of the invention are to provide a vulcanizer of this character which is comparatively simple and inexpensive in its construction, which can be readily manipulated and is at all times under the perfect control of the operator, which provides for a preliminary vulcanization of the beads when the device is used for the manufacture of tires, which has an outer surface adapted to be used for curing miscellaneous rubber articles, and which is so constructed as to provide for a rapid return of condensed steam to the water chambers by the action of gravity.

With these and other objects in view the invention consists in certain combinations, arrangements and associations of the parts, as will more fully appear as the description proceeds, the novel features thereof being pointed out in the appended claims.

For a full understanding of the invention, reference is to be had to the following description and accompanying drawing, in which—

Figure 1 is a side elevation of a vulcanizer constructed in accordance with the invention;

Fig. 2 is a vertical transverse sectional view through the same;

Fig. 3 is a top plan view thereof, a portion being broken away;

Fig. 4 is an enlarged transverse sectional view through a portion of the vulcanizer;

Fig. 5 is a transverse sectional view on a reduced scale, the bead irons being removed; and, Fig. 6 is a detail view showing a slight modification in which the channel for initially curing a bead when forming a new tire is formed in the plate instead of in the mold.

Corresponding and like parts are referred to in the following description and indicated in all of the views of the drawing by like reference characters.

Referring to the drawing, which illustrates one possible embodiment of the invention, the numerals 1 and 2 designate complemental sections of a tire-receiving mold or vulcanizer, said sections each having an annular shape and being hingedly connected at one side, as indicated at 3. The pintle 4 of the hinge is indicated as held in position by a set screw 5. The two complemental mold sections are provided at their outer peripheries with annular flanges 6 which fit against each other when the mold sections are closed. One of these flanges is shown as provided with a series of positioning pins 7 which are adapted to enter corresponding openings in the other flange and to coöperate therewith to hold the two mold sections in proper relative position when they are swung into engagement with each other. These flanges 6 are also provided with bolts 8 which can be inserted in position and tightened for the purpose of clamping a tire between the mold sections.

Each of the mold sections is hollow, being formed with an annular steam chamber 9, and the meeting face of each of the mold sections is provided with an annular tire-receiving depression 10. A water chamber 11 is provided at the base or lower end of each of the complemental mold sections, said water chambers communicating with the annular steam chambers 9 of the respective mold sections, and being shown as enlarged so as to project outwardly from the mold. The water chamber 11 of the mold section 1 is received within the upper end of a tubular stand 12 and rests upon an interior flange 13 within the stand, thereby supporting the vulcanizer in an upright and elevated position. The base of the tubular stand is formed with an outstanding flange 14 which provides an extended bearing surface and tends to prevent over-turning of the device, as well as to provide a means whereby the stand can be secured to the floor or other suitable support. A hollow burner-receiving casing 15 is fitted upon and carried by the complemental mold section 2, and burners 16 are mounted within the tubular stand 12 and hollow casing 15, respectively. The hollow casing 15 has an open inner side which is closed by the tubular stand 12 when the complemental mold sections 1 and 2 are swung together, and the lower end of the casing 15 terminates at a point above the lower end of the tubular stand 12 so that the said hollow casing 15 will not interfere in any manner with the swinging movements of the mold section 2 upon the hinge 3. The burners may be controlled in any suitable manner as by means of valves 17 in the pipes leading thereto.

The walls of the hollow mold sections 1 and 2 are sufficiently thin and suitably constructed so that they will be properly heated for the vulcanization of rubber articles by the steam which is generated from the water in the chambers 11 and confined within the interior of the mold sections. Any suitable thermostatic device or relief valve, not shown, may be utilized in connection with these steam chambers to prevent overheating or dangerous pressures. The tire-receiving depressions or grooves 10 coöperate with each other to provide a chamber to receive a tire, such as that indicated at A, and recesses 18 are provided in the grooves 10 at the inner peripheries thereof. These recesses 18 form annular clearance spaces which are arranged at opposite sides of the tire A and receive the beads of the tire. When an old tire is being retreaded or repaired these clearance spaces are left open with the result that the beads of the tire are not cured. Over-curing of the beads when repairing a tire is thus prevented. However, when the vulcanizer is used in the manufacture of tires, bead irons 19 are applied to the beads of the tire, and these bead irons fit in the clearance spaces provided by the recesses 18, as indicated by Figs. 2 and 4. When these bead irons are used the bead portions of the tire are cured as well as the tread thereof.

The tire A to be cured is fitted upon a core 20 which may be hollow, as shown, and is also provided at its inner periphery with a flange 21 which is adapted to fit within positioning notches 22 in the meeting faces of the mold sections. A tire can be tightly clamped in position within the mold by means of the clamping screws 8, and the necessary heat obtained by generating steam which is confined within the steam chambers 9 of the mold sections.

The outer face of the mold section 1 is shown as provided with an annular channel 23 which is of a suitable size and shape to receive the bead 24 of a new tire. It is common practice in manufacturing tires to partially cure or vulcanize these bead cores of the tire, and in the present instance these cores are clamped within the channel 23 by means of an annular plate 25. Clamping bolts 26 are provided for securing the annular plate 25 in proper position. The inner peripheries of the complemental mold sections are formed with surfaces 27 which are heated by the steam within the mold sections and can be utilized for curing tubes or miscellaneous articles at the same time that the vulcanizer itself is being used for the manufacture or repair of rubber tires. These surfaces 27 may be shaped or curved as may be desired, and this feature of the invention will be very valuable in small factories or repair shops. In general manufacture it is required that the tires have non-skid configurations upon the treads thereof, and when repairing such tires by successively treading different sections thereof, it is practically impossible to maintain the integrity of these markings and prevent injury thereto. With the present vulcanizer, however, the entire tire is vulcanized at the same time and the markings will be continuous and uninterrupted. This vulcanizer does not have to be cooled between successive operations, but can be operated continuously. No boiler is necessary, since each mold section or unit of the vulcanizer is provided with its own steam generating unit. It may also be noted that the annular shape of the steam chambers 9 provides in a most effective manner for the rapid return of condensed steam to the water chamber by the action of gravity, thereby eliminating a serious defect in all small vulcanizers, namely, that improperly trapped water prevents proper vulcanization of the article and produces dead water pockets. A further advantage of this mold is that it provides in a most effective manner for the preliminary heating or partial vulcanization of the bead cores when building a tire, thereby eliminating much of the cost of the equipment which is sometimes used for this purpose. Also, the outer surfaces of the mold sections are heated by the confined steam, so that portions thereof such as the faces 27 may be utilized for miscellaneous or incidental repair work.

The flange 21 of the hollow core 20 coöperates with the notched seats 22 of the mold sections to hold the tire core properly centered within the mold and also to guide and confine the core during the closing and clamping of the mold sections. This flange also coöperates with the notched seats to center the parts and bring them into proper registry when the mold is being closed. The core is shown as hollow, since in a device of this kind it has been found that a heavy cast iron core is too slow to become heated and will frequently chill the inside of the tire, with the result that a weak repair is made.

In the use of the vulcanizer it may be explained that it would be possible to use either one of the mold sections independently of the other section, and that if it is only desired to vulcanize one side of a tire this could be readily accomplished by merely heating one of the mold sections and either leave the other mold section in inoperative position or use it as a clamping member to hold the tire in position. Steam can be generated in either mold section independently of the other mold section, and it is not necessary to heat both sides of the mold unless it is desired to vulcanize both sides of the tire.

A slight modification is shown by Fig. 6 in which an annular channel 23ᵃ corresponding to the channel 23 of Fig. 2 is shown as formed in a removable plate 25ᵃ corresponding to the plate 25. The bead to be cured will be placed in this annular channel 23ᵃ and the plate 25ᵃ then clamped against the mold section. The bead will then be cured exactly as in the previous instance, the only difference being that the annular channel is formed in the removable plate instead of in the body of the mold.

It will be obvious that the complemental mold sections 1 and 2 do not necessarily have to be hinged, since they can be connected in any desired manner providing for the opening and closing thereof and the clamping of the mold sections in a closed position. Furthermore, it will be obvious that the heating may be brought about by any equivalent or desired means.

While I have described one particular embodiment of the invention, it will be obvious that I do not restrict myself to the exact details of construction, since many modifications and changes are possible without departing from the spirit of the invention as set forth in the following claims.

Having thus disclosed my invention, I claim and desire to secure by Letters Patent:

1. A tire vulcanizer including complemental sections, one of which is bodily movable toward and away from the other section, said sections having tire-receiving grooves in the meeting faces thereof, and each of said sections being hollow to provide a steam chamber and being provided with a water chamber at the bottom thereof, means for heating the water chambers, and means for holding the complemental sections together.

2. A tire vulcanizer including complemental sections, one of which is bodily movable toward and away from the other, said sections having corresponding tire-receiving grooves in the meeting faces thereof and each of said sections being hollow to provide a steam chamber and being formed with a water chamber at the bottom thereof, means for locking the sections in a closed position, and independent heating means carried by the respective complemental sections and operatively associated with the water chambers.

3. A tire vulcanizer including complemental sections, one of which is bodily movable toward and away from the other section, said sections having tire-receiving grooves in the meeting faces thereof, and each of said sections being hollow to provide a steam chamber and being formed with a water chamber at the bottom thereof, a hollow stand supporting one of the complemental sections, a heater arranged within the hollow stand, a hollow casing carried by the other complemental section and movable therewith, and a heater arranged within the hollow casing, said heaters being mounted to act upon the water chambers of the respective complemental sections.

4. A tire vulcanizer including complemental sections which are hingedly connected so that one of the sections can be swung bodily toward and away from the other section, the meeting faces of the complemental sections being provided with corresponding tire-receiving grooves and each of said sections being hollow to provide a steam chamber and being formed with a water chamber at the bottom thereof, means for locking the complemental sections together, a stand supporting one of the sections, a hollow casing carried by the other section and movable therewith toward and away from the stand, and independent heaters mounted within the stand and hollow casing, said heaters being operatively associated with the water chambers of the respective sections.

5. A tire vulcanizer including complemental annular sections which are provided in their meeting faces with corresponding tire-receiving grooves, said complemental sections being hollow to provide annular steam chambers and having water chambers at the bottom thereof, a hinge connection between the complemental sections, complemental flanges projecting from the complemental sections, and locking means connecting the flanges.

6. A tire vulcanizer including complemental sections which are provided in their meeting faces with corresponding annular tire-receiving grooves, one of said sections being bodily movable toward and away from the other section and the said grooves being each formed with an annular recess providing a clearance space for the bead of the tire, removable bead irons adapted to fit within the said recesses, means for holding the complemental sections together, and means for heating the complemental sections.

7. A tire vulcanizer including an annular member which is hollow to provide a steam chamber, one of the outer faces of the member being formed with an annular tire-receiving groove, while another outer face of the member is formed with an annular bead-receiving channel, complemental means for holding the tire in position, means for clamping the bead in position within the channel, and means for heating the interior of the hollow member.

8. A tire vulcanizer including annular complemental sections which are provided in their meeting faces with tire-receiving grooves and having a hollow formation to provide annular steam chambers, each of said sections being provided at the bottom thereof with a water chamber which extends downwardly therefrom, a tubular stand loosely receiving the water chamber of one of the sections in the upper end thereof, a hollow casing carried by the water chamber of the other section and movable therewith toward and away from the tubular stand, and independent heaters mounted within the tubular stand and hollow casing, respectively, said heaters being operatively associated with the water chambers of the two vulcanizer sections.

9. A tire vulcanizer including complemental annular sections, one of which is bodily movable toward and away from the other, said sections having corresponding tire-receiving grooves in the meeting faces thereof, a hollow tire core, and means carried by the tire core and arranged for engagement with the mold sections to center the tire core within the mold.

10. A tire vulcanizer including complemental sections, one of which is bodily movable toward and away from the other, said sections having corresponding tire-receiving grooves in the meeting faces thereof, and said grooves being provided with annular seats, a hollow tire core, and a flange carried by the tire core and coöperating with the before-mentioned seats to center the core within the mold.

11. A tire vulcanizer including complemental sections, one of which is bodily movable toward and away from the other, said sections having corresponding tire-receiving grooves in the meeting faces thereof and said grooves having corresponding annular seats at peripheral portions thereof, a hollow core, and a positioning flange projecting from the core and adapted to be received within the corresponding seats of the mold sections to hold the mold sections in proper registry and center the core within the mold.

12. A tire vulcanizer including a hollow annular ring inclosing a steam chamber and having a water chamber at the lower side of the ring, one of the walls of the annular ring forming a vulcanizing surface, with the said wall formed with a recess therein, there being a bead iron adapted to fit in said recess.

13. A tire vulcanizer including complemental annular sections, both of which are movable toward and away from each other, said sections being provided with corresponding tire-receiving grooves in the meeting faces thereof, there being means within the tire-receiving grooves adapted to form the bead of a tire when the complemental annular sections are closed.

14. A tire vulcanizer including complemental sections having corresponding tire-receiving grooves in the meeting faces thereof, said sections being hollow to provide steam chambers, and one of the sections being movable toward and away from the other, there being means within the tire-receiving grooves capable of circumferential movement within said grooves and adapted to mold a design on a tire.

In testimony whereof, I have signed my name to this specification in the presence of two subscribing witnesses.

ARTHUR J. SAVAGE.

Witnesses:
R. H. GORDON,
DANIEL C. PWELER.